(12) United States Patent
Bernsen

(10) Patent No.: US 7,436,756 B2
(45) Date of Patent: Oct. 14, 2008

(54) RECORD CARRIER AND APPARATUS ENABLING SEAMLESS PLAYBACK

(75) Inventor: Johannes Arnoldus Cornelis Bernsen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 430 days.

(21) Appl. No.: 10/548,249

(22) PCT Filed: Mar. 1, 2004

(86) PCT No.: PCT/IB2004/050174
§ 371 (c)(1),
(2), (4) Date: Sep. 6, 2005

(87) PCT Pub. No.: WO2004/081941
PCT Pub. Date: Sep. 23, 2004

(65) Prior Publication Data
US 2006/0187810 A1    Aug. 24, 2006

(30) Foreign Application Priority Data
Mar. 10, 2003    (EP) .................................. 03100593

(51) Int. Cl.
*G11B 7/007*    (2006.01)

(52) U.S. Cl. ............... 369/275.3; 369/59.25; 369/47.23
(58) Field of Classification Search ....................... None
See application file for complete search history.

(56) References Cited

U.S. PATENT DOCUMENTS

| | | | | |
|---|---|---|---|---|
| 5,778,378 A * | 7/1998 | Rubin | ..................... | 707/103 R |
| 6,448,485 B1 * | 9/2002 | Barile | ......................... | 84/609 |
| 6,556,518 B2 * | 4/2003 | Isobe et al. | .............. | 369/30.19 |
| 6,832,198 B1 * | 12/2004 | Nguyen et al. | .............. | 704/500 |
| 6,901,038 B2 * | 5/2005 | Heo | ........................ | 369/47.22 |
| 6,996,327 B1 * | 2/2006 | Park et al. | ...................... | 386/95 |
| 7,228,055 B2 * | 6/2007 | Murakami et al. | ............. | 386/52 |
| 2003/0091338 A1 * | 5/2003 | Snow et al. | .................... | 386/96 |
| 2003/0158737 A1 * | 8/2003 | Csicsatka | .................... | 704/273 |

* cited by examiner

*Primary Examiner*—Andrea Wellington
*Assistant Examiner*—Michael V Battaglia
(74) *Attorney, Agent, or Firm*—Michael E. Belk

(57) ABSTRACT

A record carrier stores audio data as audio tracks in audio files and associated management information. To avoid annoying clicks at the end or beginning of live recorded audio tracks, if those tracks are not played back seamlessly but by suppressing of introductory audio data stored in the pre-track, a seamless playback information is provided in the management information indicating if an audio track has to be played back seamlessly after a particular other audio track.

20 Claims, 2 Drawing Sheets

Figures 1, 2, 3:
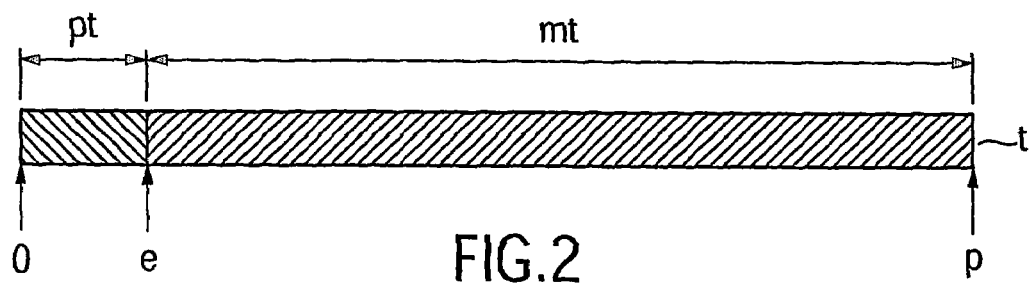

| | audio data | management information |
|---|---|---|
| | t1 | m1 |
| | t2 | m2 |
| | ...... | ...... |
| | ...... | ...... |
| | ...... | ...... |
| | ...... | ...... |
| | tx | mx |

| Syntax | # bytes | Mnemonic | Value |
|---|---|---|---|
| index() { | | | |
|   index_signature | 8 | string | |
|   Spec_Version() | 2 | | |
|   reserved_0 | 6 | bslbf | 0 |
|   while (nextbits() !=end_code) { | | | |
|     asset_ID | 4 | uimsbf | |
|     album_number | 2 | uimsbf | |
|     track_number | 2 | uimsbf | |
|     play_length | 4 | time | |
|     entry_time | 4 | time | |
|     transition_effect() | 8 | | |
|     bundle_id_hash | 4 | bslbf | |
|     mix_no | 1 | uimsbf | |
|     reserved_0 | 3 | bslbf | 0 |
|   } | | | |
|   end_code_location | 4 | bslbf | end_code |
| } | | | |

| Syntax | # bits | Mnemonic | Value |
|---|---|---|---|
| transition_effect() { | | | |
|     play_pre_track | 1 | bslbf | |
|     effect_type | 7 | uimsbf | |
|     effect_length | 32 | time | |
|     reserved_0 | 24 | bslbf | 0 |
| } | | | |
FIG.4
| Name | Value | Effect |
|---|---|---|
| No Effect | 0 | The transition is immediate, the field effect_length has no effect. |
| Silence | 1 | The transition consists of silence. |
| Crossfade | 2 | The transition consists of a crossfade. |
| | 3-127 | Reserved |
FIG.5
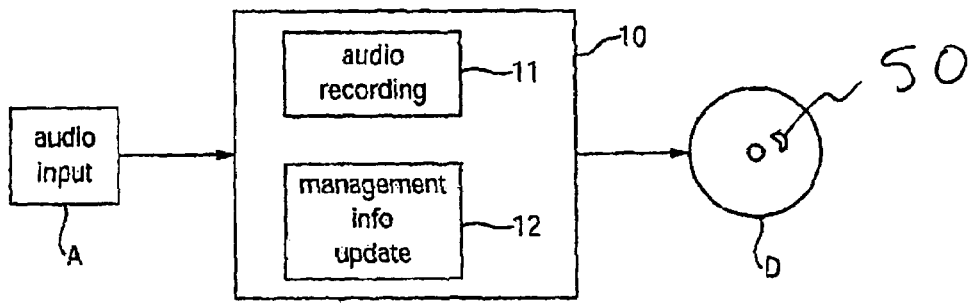
FIG.6
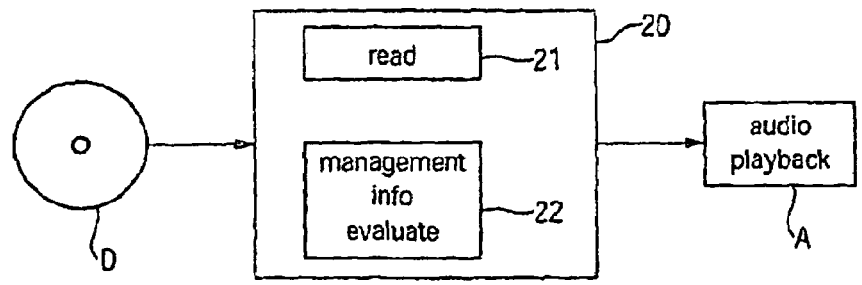
FIG.7

RECORD CARRIER AND APPARATUS ENABLING SEAMLESS PLAYBACK

The present invention relates to a record carrier comprising audio data as audio tracks in audio files and associated management information. Further, the present invention relates to a recording apparatus and method of recording audio data on such a record carrier as well as a playback apparatus and method of reading audio data stored on such a record carrier for playback.

CD players can quickly show how many audio tracks there are on the discs and how much time each audio track and the complete disc takes. Also MP3 players make this possible by use of an index file. Without such an index, the MP3 player would first have to scan all the directories, inspect each audio file, create a track file numbering and extract the play time. Thus, the use of management information associated with the audio data stored on a record carrier to present additional information to the user, in particular the playing time of audio tracks, is known.

On a CD the audio data are stored from the beginning of the first audio track and to the end of the last audio track. In between most audio tracks recorded in a studio, there is a silence. The silence belongs to the next audio track. Where this silence ends, and therefore, where the music starts again, is also noted in the management information, in particular in the table of contents (TOC) of a CD. In live recordings, there is usually sound in between the actual music. An audio track usually ends with cheering, somebody might comment on the last song, start introducing the next song, and then the music starts again. The track number usually increments somewhere in between, e.g. where the introduction of the next song is done. However, the entry in the TOC usually points to the position right where the music starts. When playing such a disc, the track number changes when the cheering for the last song ends and the next song is introduced. But when pressing the option "next track" at the player, it jumps to the position right where the music of the next song starts.

When generating MP3 audio tracks, a live recording has to be cut up into individual audio files. In the MP3 world as well as in the electronic music distribution (EMD) world, audio files are traded separately. Also MP3-like players play these audio files separately. They generally introduce themselves a pause in between audio files. Each individual audio file has to be faded in, because otherwise, the sound starts with a click. Since live recording is a continuous recording, each individual audio file also has to be faded out, since otherwise there would also be an annoying click at the end. Thus, a regular MP3 player cannot recreate the exact experience of a live recording. Other situations where this problem appears are continuous recordings where one song moves on to the next song without a break, such as a modern dance CD.

It is thus an object of the present invention to provide a record carrier as well as a corresponding recording and playback apparatus as well as corresponding methods by which this problem can be avoided and which enable a better hearing experience, in particular when live recordings or continuous recordings shall be played back.

This object is achieved according to the present invention by a record carrier to which the management information includes a seamless playback information indicating if an audio track has to be played back seamlessly after a particular other audio track.

A corresponding recording apparatus comprises management information update means for updating the management information when an audio track is recorded on the record carrier by including a seamless playback information indicating if the audio track has to be played back seamlessly after a particular other audio track.

A corresponding playback apparatus comprises management information evaluation means for evaluating the seamless playback information by playing back the read audio track seamlessly after the particular other audio track if the seamless playback information indicates that the audio track has to be played back seamlessly after the particular other audio track.

The present invention is based on the idea to include a specific piece of information into the management information which allows the playback apparatus to determine if the next audio track has to be played back seamlessly after a certain other audio track or if this seamless playback mode is not required. When the seamless playback information indicates that the audio track should be played back seamlessly, no artificial break or silence will be introduced by the playback apparatus in between audio tracks so that an annoying click at the start and/or end of a live recorded audio track will be avoided. Further, introductory audio data, such as cheering or introductory speech before the actual song in a live recording, will not be suppressed when seamless playback is required. Thus, especially for live recordings, a much better hearing experience will be the result.

According to an advantageous embodiment the management information further comprises a transition effect information specifying the transition effect to be applied during subsequent playback of two audio tracks. In particular, if playback of audio tracks must not be seamlessly, the effect in between the two audio tracks can be specified. Thus, a break, a cross-fade effect, a fade-in or a fade-out can, for instance, be defined by this transition effect information.

It is further preferred that additionally an effect length information indicating the length of said transition effect is included in said transition effect information.

As already mentioned, especially in live recordings, audio tracks comprise not only the song itself, referred to as main audio data in the following, but also introductory audio data, such as cheering and introductory speech, referred to as introductory audio data.

Each audio track in live recordings thus has a main track comprising the main audio data and, positioned in front of the main track, a pre-rack comprising such introductory audio data which is to be played back before the main audio data in seamless playback mode. Of course, for instance for studio recordings, the pre-track can also be empty.

In order to provide the user with an information about the length of the pre-track and/or to enable the playback apparatus to jump immediately to the start of the main track, even during playback of the pre-track, an additional pre-track information is included in the management information indicating the length of the pre-track. Thus, by use of the "next track" option of the playback apparatus the user can instruct the playback apparatus to immediately jump to the start of the main track and to suppress playback of the introductory audio data, also in a seamless playback mode.

The management information is preferably stored in a separate index file stored on the record carrier as part of the administrative data. However, it is also possible to store part or all of the management information in a play list, which can also be defined by a user.

The management information can also be updated when adding or deleting an audio track. An extra help when adding an audio track is an album information additionally included in the management information according to a preferred embodiment which indicates the album to which an audio track is assigned if the audio tracks are assigned to one or more albums on the disk. Thus, when a new audio track is added, the recording apparatus can easily find out whether there are already audio tracks from the same album on the disc and where to add the present audio track.

In a still further embodiment the management information comprises a database file including records of additional information related to audio tracks stored on the record carrier. Thus, a lot of textual and numerical information on all audio tracks can be stored on the record carrier in such a database file. This database file also allows the additional further records when storing further audio tracks on the record carrier. When an audio track is deleted from the record carrier, the corresponding record in the database file is preferably simply marked as invalid.

The present invention will now be explained in more detail with reference to the drawings in which FIG. 1 shows the layout of a record carrier according to the present invention sequentially, FIG. 2 shows the track structure of an audio track, according to the invention, FIG. 3 shows an example of the structure of an index file, according to the invention, FIG. 4 shows a table illustrating transition effect information, according to the invention, FIG. 5 shows a table defining different effect types, according to the invention, FIG. 6 shows a simple block diagram of a recording apparatus according to the invention and FIG. 7 shows a simple block diagram of a playback apparatus according to the invention.

As shown in FIG. 1 audio data in the form of audio tracks t1, t2, ..., tx (these can be regarded as sub-areas of an audio data area t) can be stored on the record carrier as separate audio files. Such audio files are preferably readable and transferable by a computer, and can be played back by a consumer electronics device but also by a drive included in a PC. In addition to the audio data associated management information m1, m2, ..., mx (these can be regarded as sub-areas of a management area m) is also stored on a record carrier, preferably in a predetermined area provided for these purposes. As can be seen from FIG. 1, for each audio track t an entry m in the management information area is provided.

The track structure of an audio track according to the present invention is shown in FIG. 2. As can be seen the audio track t comprises a pre-track pt and a main track mt. The total play time p is the play time of the pre-track pt and the main track mt together. The pre-track pt mainly comprises introductory audio data, such as cheering or introductory speech in a live recording, while the main track mt essentially comprises the song itself. By use of an entry time indicator e the playback apparatus can jump immediately to the start of the main track mt if a user does not want to hear the introductory audio data but immediately wants to have the main track mt to be played back. However, if a seamless playback mode is selected by a user or if a seamless playback information which will be explained in detail below indicates that the present track t needs to be played back seamlessly right from the start, the pre-track pt is also played back.

FIG. 3 shows an embodiment of an index file used according to the present invention for storing management information. In the various columns besides the syntax the number of bytes (# bytes), the mnemonic and an exemplary value are given in this table. The fields will be explained in the following.

The end_code includes a 4-byte hexadecimal number with a value of 0x00000000 that indicates the termination of the structure of the index file index( ).

Spec_version is a 2-byte number showing the version number of the format.

The field index_signature shall be filled with a particular string used as signature.

The asset_ID contains the asset ID of an audio file. All asset IDs present in the index file shall be unique, i.e. they are not allowed to appear more than once. The order in which asset IDs appear in the index file is not prescribed. The value of 0x00000000 is not allowed.

The album_number contains the number assigned to the album that contains the audio file which is indicated by the previous field asset_ID. The order in which album numbers appear in the index file is not prescribed. A value of 0x0000 is not allowed.

The track_number contains the track number of the audio file within the album indicated in the previous field album_number. It is also called "position". The order in which track numbers appear in the index file is not prescribed. A value of 0x00000000 is not allowed.

The play_length contains the total play time of the main audio stream in the audio file.

The entry_time contains the length of the pre-track pt of the audio stream in the audio track.

The transition_effect contains the transition effect to be applied between the previous audio track and the present audio track, when audio tracks are played in the order of the index file. This field will be explained in more detail below with reference to FIGS. 4 and 5.

The bundle_ID_hash contains the hash of the bundle ID of the audio file. The hash function to be used is preferably the CRC-32 hash as defined in ISO 8802-3:1998(IEEE802.3) or POSIX1003.2.

The mix_no contains 0 in case the audio file contains one mix of the audio data. In case the audio file contains more than one mix, e.g. a stereo and a multi-channel mix, the index file shall contain entries for each of these mixes. The field mix_no will be used to identify these mixes. Numbering shall start at 0 and be incremented by 1 for each additional mix.

The end_code_location holds the value of end_code that indicates the termination of the index file structure.

The mnemonics used in the table have the following meaning: "bslbf" means "Bit Sequence Left Bit First" which must be interpreted as a bit stream. The term "uimsbf" means "Bit Sequence Most Significant Bit First" which must be interpreted as unsigned integer (so multi-byte integers have most significant byte first).

The transition effect field is defined in the table shown in FIG. 4. The term "previous track" here means the previous track when audio tracks are played in the order of the index file or in the order of one of several audio play lists which can be defined by users. The meanings of the fields defined for the transition effect are as follows:

The play_pre_track determines where to start playing this audio track when audio tracks are played in the order of the index file or if seamless playback mode shall be used, i.e. this field actually indicates if this audio track shall be played seamlessly after a particular other audio track, which is for instance important for live recordings. If this field has the value 1, then this audio track shall be played including the pre-track, i.e. seamlessly from relative time 0 (see FIG. 2). If this field has the value 0, then this audio track shall be played from entry time e, i.e. only the main track mt shall be played back.

The effect_type contains the effect to be applied in between the previous audio track and the start of the present audio track, as determined by the value of play_pre_track. The effects are defined and explained in the table shown in FIG. 5. Possible effects are thus silence, cross-fade or no effect. Of course, further effects can be defined as well.

The effect_length indicates the length of the effect defined in effect_type.

A block diagram of a recording apparatus 10 according to the present invention is shown in FIG. 6. Inputted audio data A is recorded on a disc D by an audio recording unit 11. Additionally, management information associated with the recorded audio data is updated by a management information update unit 12. Thus, for instance, when new audio tracks are added for storage on the disc D, simply a new record is added to the index file or, preferably, to a larger additional database file 50 comprising numerical and textual information regarding the stored audio data and being much larger than the index file. Also, if an audio track is deleted from the record carrier D, the management information will be updated, e.g. by simply marking a record in the management information area as invalid. This allows for in-place editing of files, which is an advantage over having to read or write the whole file again.

A simple block diagram of a playback apparatus 20 according to the present invention is shown in FIG. 7. Data are read from the disc D by a reading unit 21. Further, related management information is also read and evaluated by a management information evaluation unit 22. In particular, based on the read management information the transition effect for the transition from a previous audio track to the present audio track will be determined, e.g. if a silent break shall be introduced or not or if a cross-fade effect shall be applied. Based on the read play_pre_track information stored in the management information it will further be decided if a seamless playback must be applied, i.e. if the pre-track pt must be played back or not which is important for live recordings to avoid annoying clicks at the end or the beginning of a live recorded audio track. Thus a much better hearing experience will be enabled by the playback apparatus according to the present invention evaluating such management information.

The invention claimed is:

1. A record carrier comprising audio data as audio tracks in audio files and associated management information, said management information comprising seamless playback information indicating if an audio track has to be played back seamlessly after a particular other audio track, wherein said audio track comprises a main track and a pre-track, said main track comprising main audio data and said pre-track comprising introductory audio data to be played back before the main audio data in a seamless playback mode, and wherein said management information comprises pre-track information indicating a length of the pre-track.

2. The record carrier as claimed in claim 1, wherein said management information further comprises transition effect information specifying a transition effect to be applied during subsequent playback of two audio tracks.

3. The record carrier as claimed in claim 2, wherein said transition effect information comprises effect length information indicating a length of the transition effect.

4. The record carrier as claimed in claim 1, wherein said management information is stored as a separated index file or is included in a play list.

5. The record carrier as claimed in claim 1, wherein the audio track is assigned to one or more albums and wherein the management information comprises album information indicating an album to which the audio track is assigned.

6. The record carrier as claimed in claim 1, wherein said management information further comprises a database file comprising records of additional information related to audio tracks stored on the record carrier, said database file allowing addition of further records when storing further audio tracks on the record carrier and marking of records as invalid when deleting audio tracks.

7. A recording apparatus for recording audio data as audio tracks in audio files and associated management information on a record carrier, comprising audio recording means for recording an audio track and said management information on the record carrier, the apparatus further comprising management information update means for updating said management information by including seamless playback information indicating if the audio track has to be played back seamlessly after a particular other audio track, wherein said audio recording means is adapted for recording said audio track comprising a main track and a pre-track, said main track comprising main audio data and said pre-track comprising introductory audio data to be played back before the main audio data in a seamless playback mode, and wherein said management information update means is adapted for updating said management information by including pre-track information indicating a length of the pre-track.

8. The recording apparatus as claimed in claim 7, wherein said management information update means is adapted for updating said management information by including transition effect information specifying a transition effect to be applied during subsequent playback of two audio tracks.

9. The recording apparatus as claimed in claim 8, wherein said management information update means is adapted for updating said management information by including effect length information indicating a length of the transition effect.

10. The recording apparatus as claimed in claim 7, wherein said audio recording means is adapted for recording said management information as a separated index file or included in a play list.

11. The recording apparatus as claimed in claim 7, the audio track being assigned to one or more albums, wherein said management information update means is adapted for updating said management information by including album information indicating an album to which the audio track is assigned.

12. The recording apparatus as claimed in claim 7, wherein said management information update means is adapted for updating said management information by including a database file comprising records of additional information related to audio tracks stored on the record carrier.

13. A method of recording audio data as audio tracks in audio files and associated management information on a record carrier, wherein said management information is updated when an audio track is recorded on the record carrier by including a seamless playback information indicating if the audio track has to be played back seamlessly after a particular other audio track, wherein the audio track comprises a main track and a pre-track, said main track comprising main audio data and said pre-track comprising introductory audio data to be played back before the main audio data in a seamless playback mode, and wherein said management information comprises pre-track information indicating a length of the pre-track.

14. A playback apparatus for reading audio data stored as audio tracks in audio files and associated management information from a record carrier and for playback of a read audio track, said management information including seamless playback information indicating if the audio track has to be played back seamlessly after a particular other audio track, the apparatus comprising reading means for reading the audio track and said management information from the record carrier, the apparatus further comprising management information evaluation means for evaluating said seamless playback information by playing back the read audio track seamlessly after the particular other audio track in dependence of the seamless playback information, wherein said reading means is adapted for reading said audio track comprising a main track and a pre-track, said main track comprising main audio data and said pre-track comprising introductory audio data to be played back before the main audio data in a seamless playback mode, and wherein said management information evaluation means is adapted for evaluating pre-track information indicating a length of the pre-track, said pre-track information comprised in said management information.

15. The playback apparatus as claimed in claim 14, wherein said management information evaluation means is adapted for evaluating transition effect information specifying a transition effect to be applied during subsequent playback of two audio tracks, said transition effect information comprised in said management information.

16. The playback apparatus as claimed in claim 15, wherein said management information evaluation means is adapted for evaluating transition effect information comprising effect length information indicating a length of the transition effect.

17. The playback apparatus as claimed in claim 14, wherein said reading means is adapted for reading said management information as a separated index file or included in a play list.

18. The playback apparatus as claimed in claim 14, the audio track being assigned to one or more albums, wherein said management information evaluation means is adapted for evaluating album information indicating an album to which the audio track is assigned, said album information comprised in said management information.

19. The playback apparatus as claimed in claim 14, wherein said reading means is adapted for reading a database file comprising records of additional information related to audio tracks stored on the record carrier, said database comprised in said management information.

20. A method of reading audio data stored as audio tracks in audio files and associated management information from a record carrier and of playback of the read audio track, said management information including a seamless playback information indicating if the read audio track has to be played back seamlessly after a particular other audio track, wherein said seamless playback information is evaluated by playing back the read audio track seamlessly after the particular other audio track in dependence of the seamless playback information, wherein the read audio track comprises a main track and a pre-track, said main track comprising main audio data and said pre-track comprising introductory audio data to be played back before the main audio data in a seamless playback mode, and wherein said management information comprises pre-track information indicating a length of the pre-track.

* * * * *